United States Patent [19]

Brudereck et al.

[11] Patent Number: 4,702,175
[45] Date of Patent: Oct. 27, 1987

[54] TROLLEY WITH CABLE SUSPENSION

[75] Inventors: Ulrich Brudereck, Iserlohn; Klaus-Dieter Gabriel, Wetter, both of Fed. Rep. of Germany

[73] Assignee: Mannesmann AG, Duesseldorf, Fed. Rep. of Germany

[21] Appl. No.: 709,506

[22] Filed: Mar. 8, 1985

[30] Foreign Application Priority Data

Mar. 16, 1984 [DE] Fed. Rep. of Germany ....... 3409628

[51] Int. Cl.$^4$ ................................................ B61B 3/00
[52] U.S. Cl. .................................... 105/154; 16/102; 248/51; 248/74.3; 248/60
[58] Field of Search ............................ 16/87.4 R, 102; 191/12 R; 104/89, 93, 94, 95; 105/148, 154, 155; 198/685, 686, 687; 248/51, 60, 74.3, 74.4

[56] References Cited

U.S. PATENT DOCUMENTS

| 1,488,651 | 4/1924 | Schumacher, Jr. | 191/12 R |
| 3,289,983 | 12/1966 | Mennerdahl | 191/12 R |
| 3,704,350 | 11/1972 | Itoh | 191/12 R |
| 3,802,351 | 4/1974 | Pascuzzi | 191/12 R |
| 4,078,769 | 3/1978 | Wamfler | 191/12 R X |
| 4,149,298 | 4/1979 | Forest | 248/74.3 X |
| 4,525,893 | 7/1985 | Fukada | 16/102 |
| 4,561,153 | 12/1985 | Matsui | 248/74.4 X |

FOREIGN PATENT DOCUMENTS

| 1474237 | 1/1969 | Fed. Rep. of Germany .... 191/12 R |
| 2206309 | 8/1973 | Fed. Rep. of Germany .... 191/12 R |
| 573741 | 3/1958 | Italy ................................. 191/12 R |
| 636705 | 3/1962 | Italy ................................. 191/12 R |
| 146369 | 4/1931 | Switzerland ..................... 191/12 R |
| 2105179 | 3/1983 | United Kingdom ........... 16/87.4 R |

Primary Examiner—Robert B. Reeves
Assistant Examiner—Carol L. Olson
Attorney, Agent, or Firm—Ralf H. Siegemund

[57] ABSTRACT

A trolley is provided as a carriage with rollers running on a rail, and a cable suspension in form of a flexible loop element is suspended from this trolley carriage. The loop element has its end interconnected in the area of suspension, and carries in its lower portion a curved cable supporting platform against which the cable is fastened by means of a flexible clamping band extending through lateral slots of the loop element.

10 Claims, 5 Drawing Figures

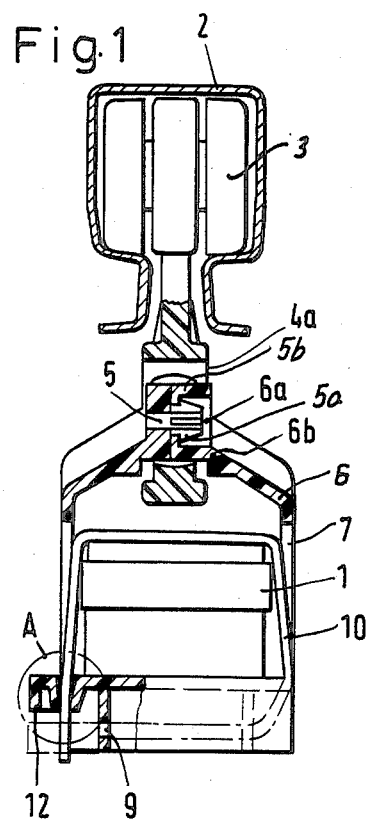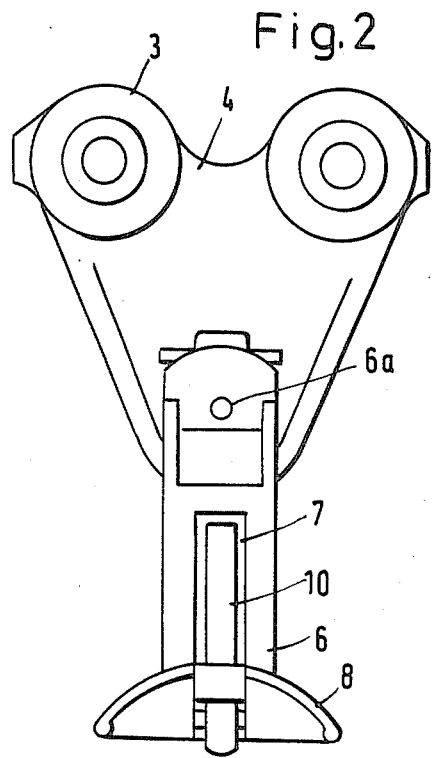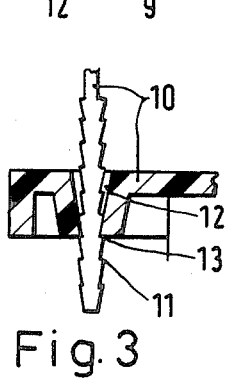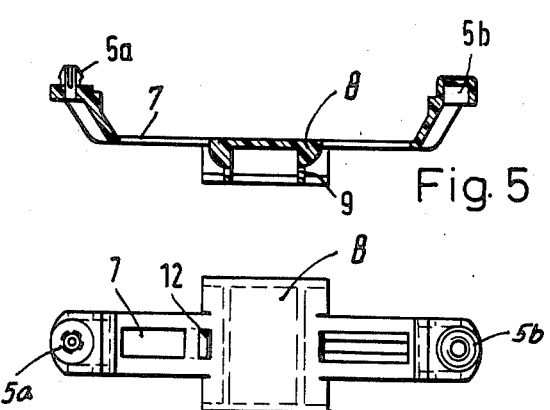

TROLLEY WITH CABLE SUSPENSION

BACKGROUND OF THE INVENTION

The present invention relates to a cable carriage or trolley having a base frame with rollers for running on a rail, the cable being fastened to the base frame or trolley carriage body by means of a suspension device gripping around the cable.

Cable trolleys of the type to which the invention pertains are, for example, shown in German Pat. No. 2,262,191. This patent moreover discloses a cable suspension which includes a round rod running through the trolley body, and having downwardly extending ends being provided with threads so that a cable support platform can be fastened thereto by means of nuts. This particular type of suspension was found to be quite practical, and is particularly to be recommended for heavy suspensions used, for example, when several cable bundles are suspended one above the other. On the other hand, for lighter loads, this kind of heavy duty suspension is really not justified.

DESCRIPTION OF THE INVENTION

It is an object of the present invention to provide a new and improved simplified and economic suspension for cable in a cable trolley, which suspension device can easily be mounted to the trolley body or frame.

In accordance with the preferred embodiment of the present invention, it is suggested to provide a cable suspension from a trolley in the form of a loop having two slots for receiving a clamping band. The loop carriers the cable, and the clamping band is run through the slots and secures the cable within the loop against slippage. This arrangement is indeed very economical, and can easily be suspended and assembled to the trolley body of the type mentioned before.

In furtherance of the invention, the loop may be provided with an upwardly bulging or curved cable carrying support platform being situated basically under the cable to be carried, and extending transversely to the direction of movement of the trolley. A plug-through eye for the clamping band may be provided underneath the cable carrying platform. The sides of the upwardly bulging platform determine the lower level for the slot for the clamping band; these slots reach above the level of the cable so that the cable can readily be secured in the loop element by means of the band with very little expense.

The clamping band is preferably constructed as a tension strip being preferably provided at one end at least with fine, transverse ribs, and being run through a clamping eye at the other end or foot of the band. The band, as well as the loop element, is preferably made of a synthetic material, and actually the clamping band and loop may be of a single piece configuration.

In furtherance of the invention the loop is fastened to the trolley body or vehicle carriage or frame by means of the loop ends and through a transverse connection between the ends, which transverse connection is preferably configured as a pin with matching sleeve, and being provided at the end of the loop having abutment shoulders. Alternatively, a sleeve rivet or a screw or bolt can be used.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 is a cross section through a rail and trolley constructed in accordance with the preferred embodiment of the present invention for practicing the best mode thereof.

FIG. 2 is a side elevation of the trolley shown in FIG. 1.

FIG. 3 illustrates the detail indicated by a capital A in FIG. 1,, and on an enlarged scale.

FIG. 4 illustrates the loop element of FIG. 1, but in geometric development, or folded open disposition.

FIG. 5 is a longitudinal section view through such a loop element.

Proceeding now to the detailed description of the drawings, the figures show a rail 2 in hollow configuration and receiving in its interior rollers 3 of a trolley having a basic body or frame 4. This body or frame 4 is provided with a transverse bore 4a which receives a snap connection portion made of a synthetic material, and pertaining to the ends 6a of a loop element 6. The loop extends in the plane of FIG. 1 which is transverse to the direction of trolley movement. The snap connection for closing the loop is integral with these ends 6a of the loop element, and includes a pin 5a on one end, as well as a sleeve 5b on the other end. The individual components of this synthetic snap connection are unreleasably interconnected simply by forcing the pin element 5a into the sleeve 5b so that the shoulders of the conical pin elements 5a lodge behind a rim or ridge at one end of the sleeve 5b. The connecting elements 5a and 5b can also be construed as rivet-like connection. In addition, the ends 6a generally of the loop element are provided with abutment shoulders 6b which extend below the level of the lowest point of bore 4a as far as the suspension is concerned, and secure therefore the loop element against slippage in direction transverse to the direction of movement, which is basically longitudinal as far as the bore 4a is concerned.

The reference numeral 8 refers to a downwardly bent or upward bulging cable carrying platform being connected to the loop element 6 in the lower portion thereof. This platform 8 carries a cable, such as cable 1. A feed-through eye 9 extends down from the platform 8 for being traversed by a clamping band 10. This clamping band 10 runs in slots 7 of the loop element 6, so as to be situated in an area that is laterally displaced from the cable 1 as it is being carried by and supported by the platform 8. A feed-through clamping eye 12 at one end of the band possibly being a part of loop element 6 also receives the front end band 10, and it is in fact pulled tight through this eye 12 (see FIG. 3), whereby particularly transverse ribs or serrations 11 of that band 10 prevent retraction of the band, the ribs lodge behind a projection 13, being part of the feed-through clamping eye 12.

However, the dash-dot lines in FIG. 1 show how a separate clamping band can be also passed through the feed-through eye 9. The clamping arrangement as shown in FIG. 3 has validity for both types of band configurations.

The invention is not limited to the embodiment described above, but all changes and modifications thereof not constituting departures from the spirit and scope of the invention are intended to be included.

What is claimed is:

1. In a trolley having rollers for running on a rail further having a frame for these rollers, a cable suspension construction suspended from the frame comprising: a closed loop element suspended from said trolley frame and having two aligned slots and looping in a plane transversely to a direction of trolley movement; a clamping band connected to the loop element, the two slots in said loop element being traversed by said clamping band for releasably clamping a cable resting on a lower cable support portion of the loop element thereagainst.

2. The improvement as in claim 1, said closed loop element having in its lower portion a cable support platform extending basically transversely to a direction of movement of the trolley and being of upwardly bulging configuration.

3. The improvement as in claim 2, said support platform being provided with a feed through eye for the clamping band, said clamping band having a foot portion being provided with a feed through clamping eye to receive an end of the clamping band as it is clampingly looped around the cable on said platform.

4. The improvement as in claim 2, said slots extending from the platform to a level well above the expected height and thickness of the cable on the platform.

5. The improvement as in claim 1 wherein said clamping band is provided with transverse ribs, the ribs being particularly on the end of the band, there being a feed through clamping eye into which said ribbed end of the clamping band is inserted for fastening thereto.

6. The improvement as in claim 1 wherein said clamping band and said loop element are made of a synthetic material.

7. The improvement as in claim 1, said loop element having ends constructed as transverse connection for connection to the frame.

8. The improvement as in claim 7, said ends of the loop element being respectively provided with a pin and a sleeve for receiving the pin to obtain said transverse connection.

9. The improvement as in claim 7, said end being interconnected in rivet-like fashion.

10. The improvement as in claim 7, said ends being provided with respective abutment shoulders to secure the loop element against lateral displacement with respect to said frame.